(12) United States Patent
Santhanam

(10) Patent No.: US 12,046,996 B2
(45) Date of Patent: Jul. 23, 2024

(54) INTEGRATED SWITCHED CAPACITOR BANK

(71) Applicant: Aclara Technologies LLC, St. Louis, MO (US)

(72) Inventor: Balaji Santhanam, Parsippany, NJ (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 17/823,174

(22) Filed: Aug. 30, 2022

(65) Prior Publication Data

US 2023/0067982 A1    Mar. 2, 2023

Related U.S. Application Data

(60) Provisional application No. 63/238,494, filed on Aug. 30, 2021.

(51) Int. Cl.
*H02M 1/42*    (2007.01)
*H02J 3/20*    (2006.01)
*H02J 7/34*    (2006.01)

(52) U.S. Cl.
CPC ............. *H02M 1/4216* (2013.01); *H02J 3/20* (2013.01); *H02J 7/345* (2013.01)

(58) Field of Classification Search
CPC ........... H02M 1/4216; H02J 3/20; H02J 7/345
USPC ........................................................ 307/109
See application file for complete search history.

(56) References Cited

U.S. PATENT DOCUMENTS

| | | | |
|---|---|---|---|
| 7,495,574 B2* | 2/2009 | Rocamora | G08C 17/02 361/115 |
| 8,537,508 B2* | 9/2013 | Faxvog | H02H 5/005 361/35 |
| 10,700,542 B2* | 6/2020 | Gerovac | H02J 3/18 |
| 2006/0084419 A1 | 4/2006 | Rocamora et al. | |
| 2010/0170774 A1 | 7/2010 | Einschenk et al. | |
| 2012/0019962 A1 | 1/2012 | Faxvog et al. | |
| 2014/0306549 A1 | 10/2014 | Gerovac et al. | |
| 2015/0177306 A1 | 6/2015 | Hedlund et al. | |
| 2020/0194200 A1 | 6/2020 | Bishop et al. | |

OTHER PUBLICATIONS

PCT/US2022/041999 International Search Report and Written Opinion dated Nov. 29, 2022.

* cited by examiner

*Primary Examiner* — Hal Kaplan
(74) *Attorney, Agent, or Firm* — Michael Best & Friedrich LLP

(57) ABSTRACT

A switched capacitor bank assembly including a first capacitor, a first switch selectively connected between the first capacitor and a first phase line, and a first voltage sensor integrated within a housing of the first switch and configured to sense a voltage of the first phase line. The assembly further includes a controller including an electronic processor, the controller operably coupled to the first voltage sensor and the first switch. The first capacitor, the first switch, the first voltage sensor, and the controller are physically supported by a frame of the switched capacitor bank assembly.

19 Claims, 13 Drawing Sheets

-PRIOR ART-

INTEGRATED SWITCHED CAPACITOR BANK

RELATED APPLICATIONS

This application claims the benefit of U.S. Provisional Patent Application No. 63/238,494, filed Aug. 30, 2021, the entire content of which is hereby incorporated by reference.

FIELD

Embodiments relate to capacitor bank switch assemblies.

SUMMARY

Switched capacitor banks may be installed on poles and/or at substations to apply power factor correction (e.g., by altering the load phasing) to the power grid in response to the application and removal of heavy industrial inductive loads. When loads are not in phase, additional reactive currents increase transmission losses, which may result in wasted energy and a need for additional generating capacity. Thus, capacitor banks are used to help improve the transfer efficiency of electrical energy being transmitted through the power grid. Charging and discharging of the capacitors is controlled with switches based on power factor correction needs of the grid.

FIG. 1 illustrates an exemplary capacitor bank assembly 100 according to existing switched capacitor banks of the prior art. Existing switched capacitor banks, such as the assembly 100, are highly complex, engineered-to-order solutions that require a combination of several components provided by various manufacturers. Key components of a typical switched capacitor bank include capacitors, capacitor switches, a controller, current and/or voltage sensors, junction boxes, cable assemblies, arrester, wildlife protectors, power transformers, and other devices.

For example, the illustrated switched capacitor bank assembly 100, which is a pole-mounted assembly used in medium voltage applications (e.g., approximately 5 kV—38 kV), includes numerous third-party components that are separately installed and interconnected by an assembly of cables. As shown, the assembly 100 includes a capacitor bank 105 that is installed on distribution pole 107 at an elevation between approximately 30 and 50 feet above ground. The capacitor bank 105 includes capacitors 110, capacitor switches 115, a junction box 120, and a power transformer 125. The assembly 100 further includes voltage sensors 130, which are installed at the top of distribution pole 107 (e.g., approximately 40-50 feet above ground), and a control cabinet, or controller, 135, which is installed at the bottom of distribution pole 107 (e.g., approximately 5 feet above ground). The assembly 100 further includes numerous cables 140 that are needed to interconnect the components of the assembly 100. For example, one or more sensor cables 140A, which may be 14-pin cables that exceed 40-50 feet in length, are used to connect the voltage sensors 130 to the controller 135. In addition, one or more control cables 140B, such as 19-pin cables, are needed to connect the controller 135 to the capacitor switches 115, the junction box 120, and/or other working components of the assembly 100.

Given the complexity and variety of third-party components included in existing switched capacitor bank assemblies, system integrators are frequently relied upon during the installation process. As a result, these assemblies may require long install times, may be difficult to troubleshoot, and may be expensive to maintain over the course of a 20+ year product lifespan. In addition, the sensing accuracy in existing capacitor bank assemblies may suffer due to magnitude and phase errors and signal interference caused by lengthy sensor and control cables included in the assembly. Thus, a solution that simplifies the complexity of the capacitor bank assembly, reduces installation time, and significantly reduces the troubleshooting and maintenance costs associated to capacitor banks over the life of the capacitor bank is desired.

One aspect of the present disclosure provides a switched capacitor bank assembly including a first capacitor, a first switch selectively connected between the first capacitor and a first phase line, and a first voltage sensor integrated within a housing of the first switch and configured to sense a voltage of the first phase line. The switched capacitor bank assembly further includes a controller that includes an electronic processor and is operably coupled to the first voltage sensor and the first switch. The switched capacitor bank assembly further includes a frame arranged to physically support the first capacitor, the first switch, the voltage sensor, and the controller.

Another aspect of the present disclosure provides a multi-phase power system a plurality of phase lines, which includes a first phase line, a second phase line, and a third phase line, and a switched capacitor bank assembly. The switched capacitor bank assembly includes a plurality of capacitors including a first capacitor, a second capacitor, and a third capacitor, a plurality of voltage sensors including a first voltage sensor for measuring a voltage of the first phase line, a second voltage sensor for measuring a voltage of the second phase line, and a third voltage sensor for measuring a voltage of the third phase line, and a plurality of switches including a first switch connected between the first phase line and the first capacitor, a second switch connected between the second phase line and the second capacitor, and a third switch connected between the third phase line and the third capacitor. The switched capacitor bank assembly further includes a controller including an electronic processor and coupled to the plurality of voltage sensors and the plurality of switches, the controller configured to selectively connect, using the plurality of switches, the plurality of capacitors to the respective ones of the plurality of phase lines based on signals received from the plurality of voltage sensors. Furthermore, the switched capacitor bank assembly includes a frame arranged to physically support the plurality of capacitors, the plurality of voltage sensors, the plurality of switches, and the controller.

Other aspects of the disclosure will become apparent by consideration of the detailed description and accompanying drawings.

DETAILED DESCRIPTION

Figure 1:
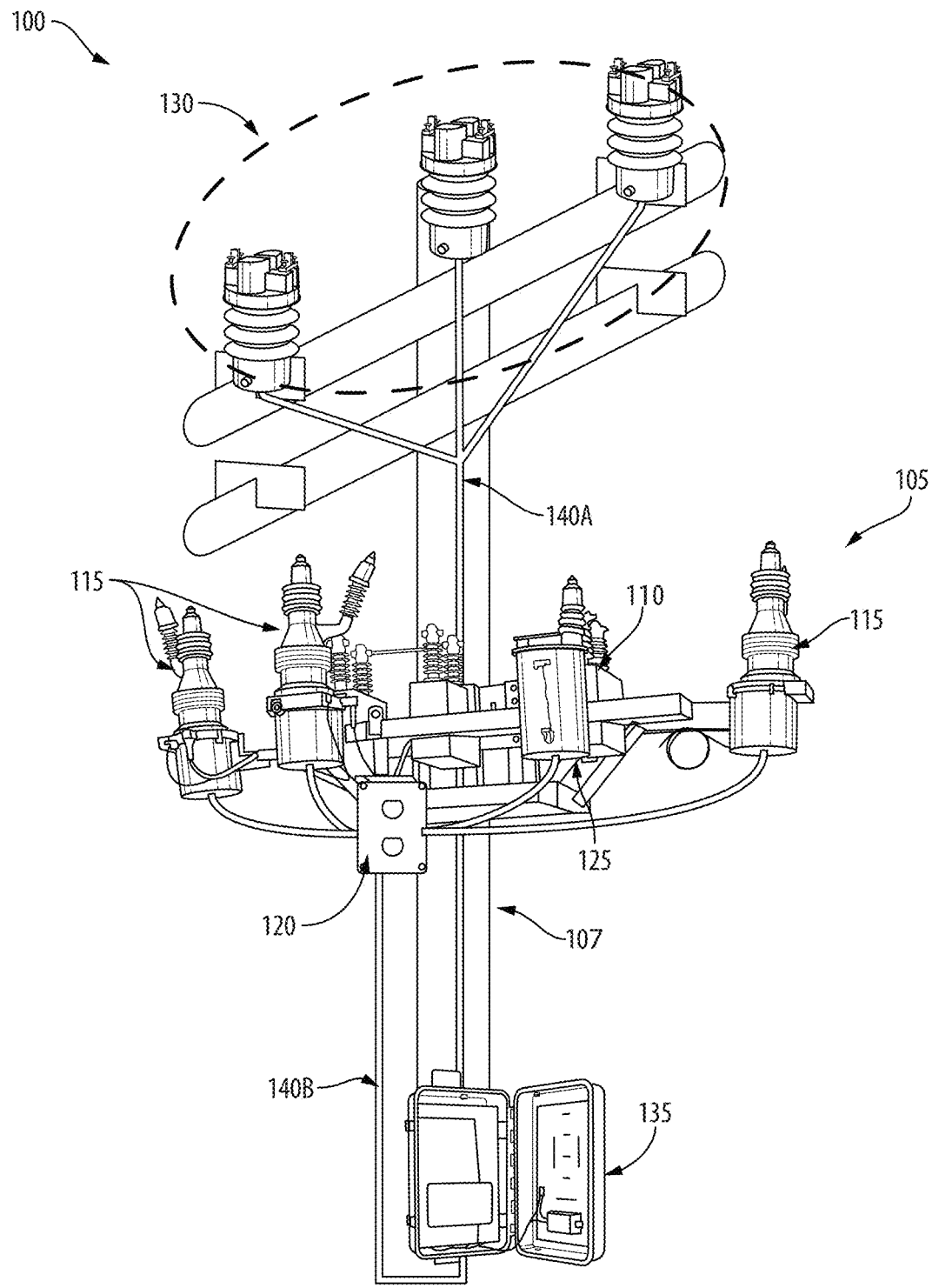
FIG. 1 illustrates a switched capacitor bank assembly according to the prior art.
Figure 2A:
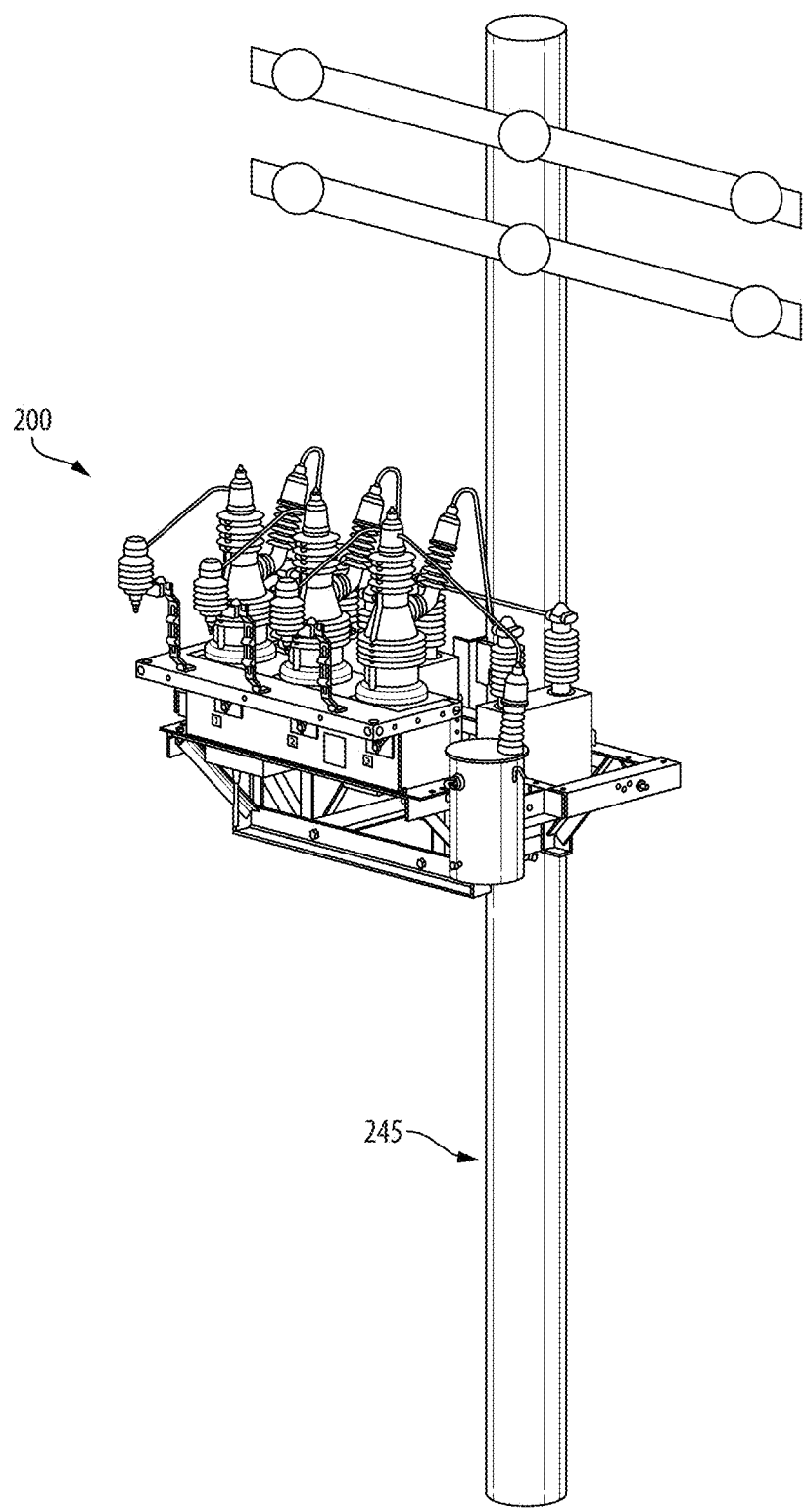
FIG. 2A illustrates a switched capacitor bank assembly according to some embodiments.
Figure 3A:
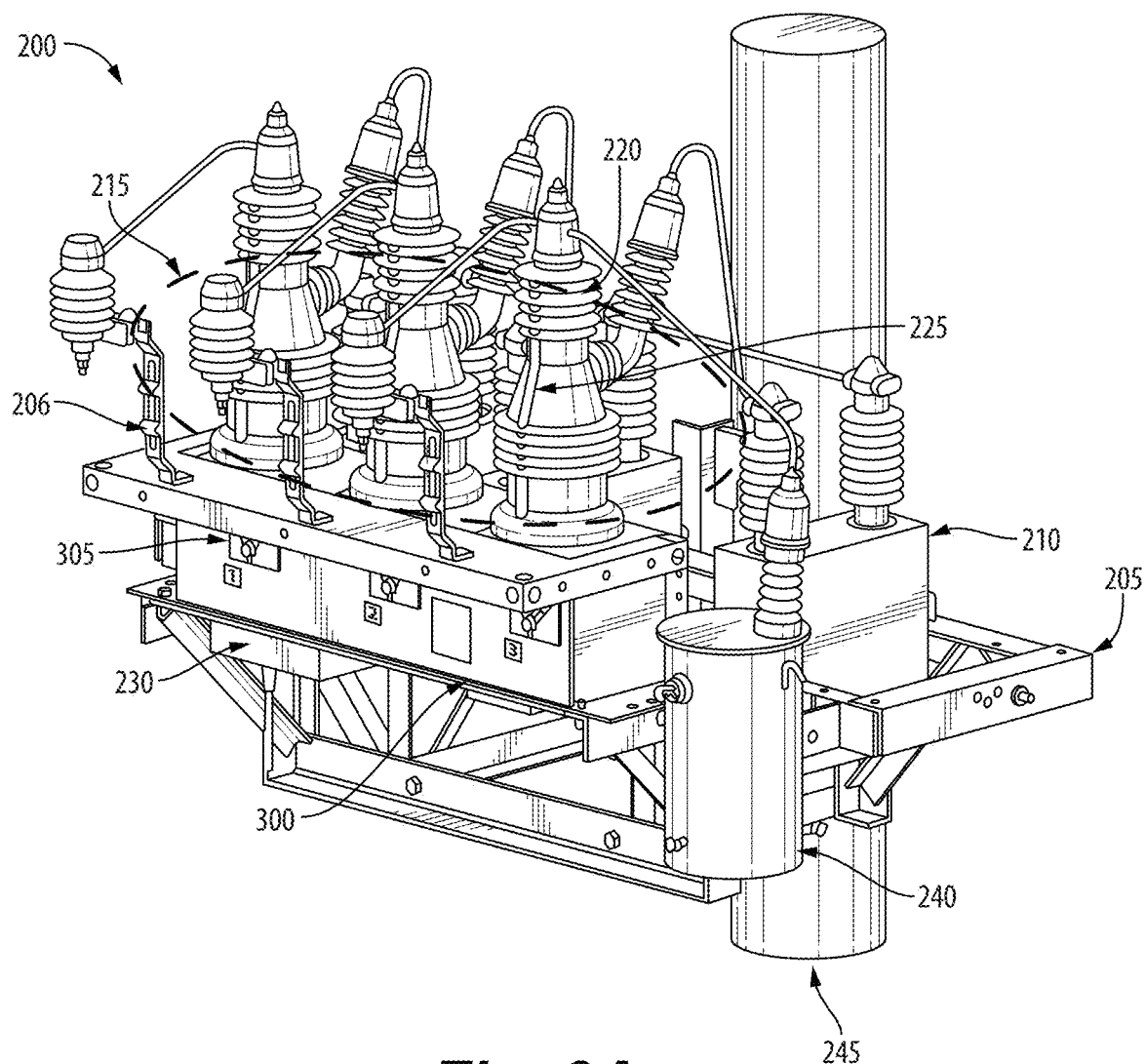
FIG. 3A illustrates a first perspective view of the switched capacitor bank assembly of FIG. 2A or FIG. 2B.
Figure 3B:
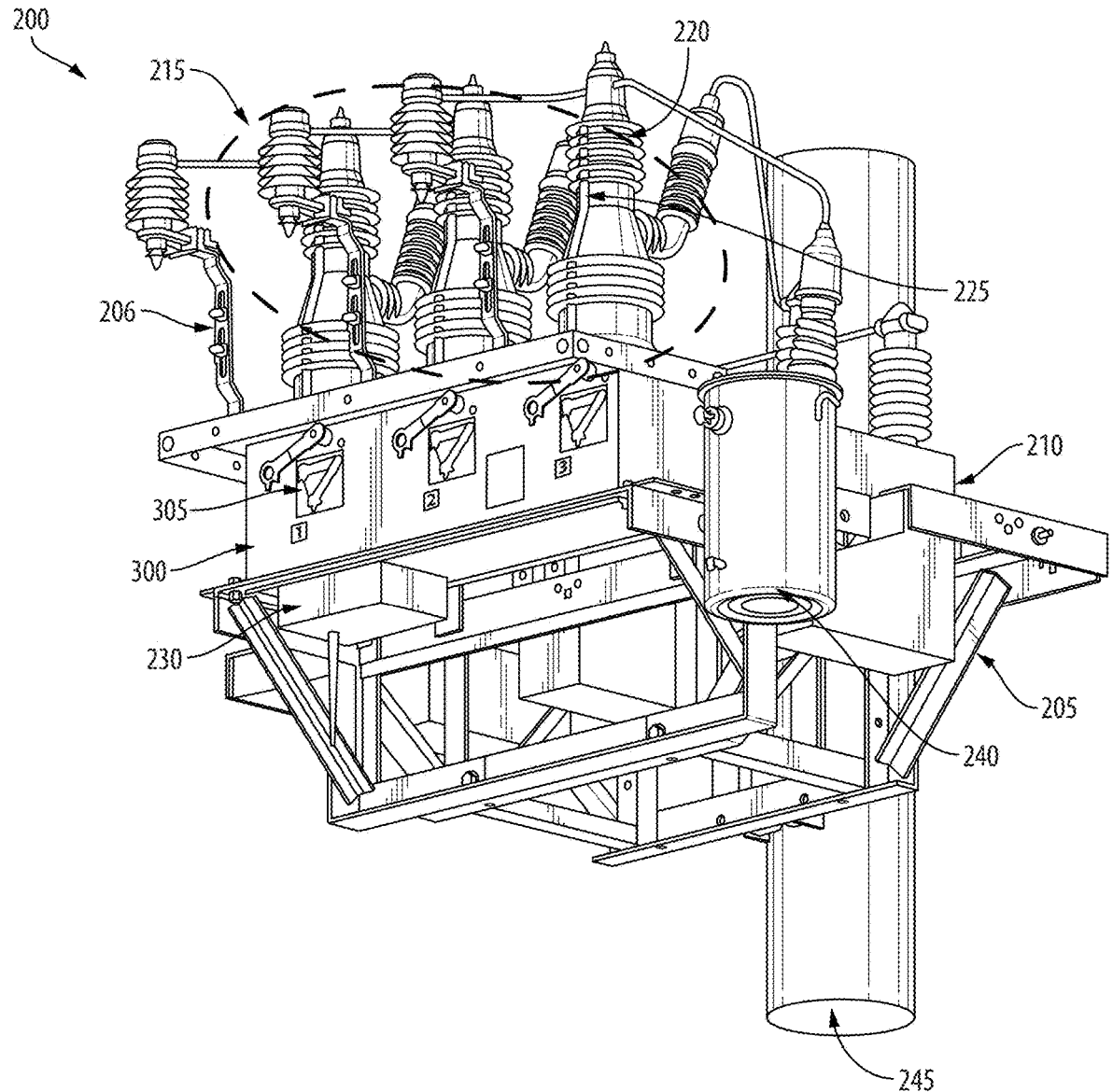
FIG. 3B illustrates a second perspective view of the switched capacitor bank assembly of FIG. 2A or FIG. 2B.

FIG. 2A illustrates an integrated switched capacitor bank assembly, or "integrated assembly," 200 according to some embodiments of the present disclosure. FIGS. 3A-3B illustrate close-up perspective views of the integrated assembly 200. When compared to the prior art assembly 100 of FIG. 1, all of the components of the integrated assembly 200 are contained within a single package. As will be described in more detail below, the integrated assembly 200 includes a frame 205 that is arranged to physically support the components, such as, but not limited to, capacitors 210A-210C, capacitor switches 215A-215C, dielectric bushings 220A-220C, voltage sensors 225A-225C, a controller 230, a communication module 235 (FIG. 5), and/or a power transformer 240, included in the integrated assembly 200. Accordingly, installation of the integrated assembly 200 is simplified and less expensive when compared to the prior art assembly 100 of FIG. 1. That is, the integrated assembly 200 does not include various third-party components that are separately installed at varying heights along a distribution pole and interconnected by long and expensive cable assemblies. Rather, as shown in FIG. 2A, the integrated assembly 200 can be installed at a single location, such as 40 feet above ground, on a distribution pole 245 without the need for lengthy cables to interconnect components. In addition, none of the components supported on the frame 205, such as the controller 230, are easily within reach of would be thieves or other malicious actors.

Figure 2B:
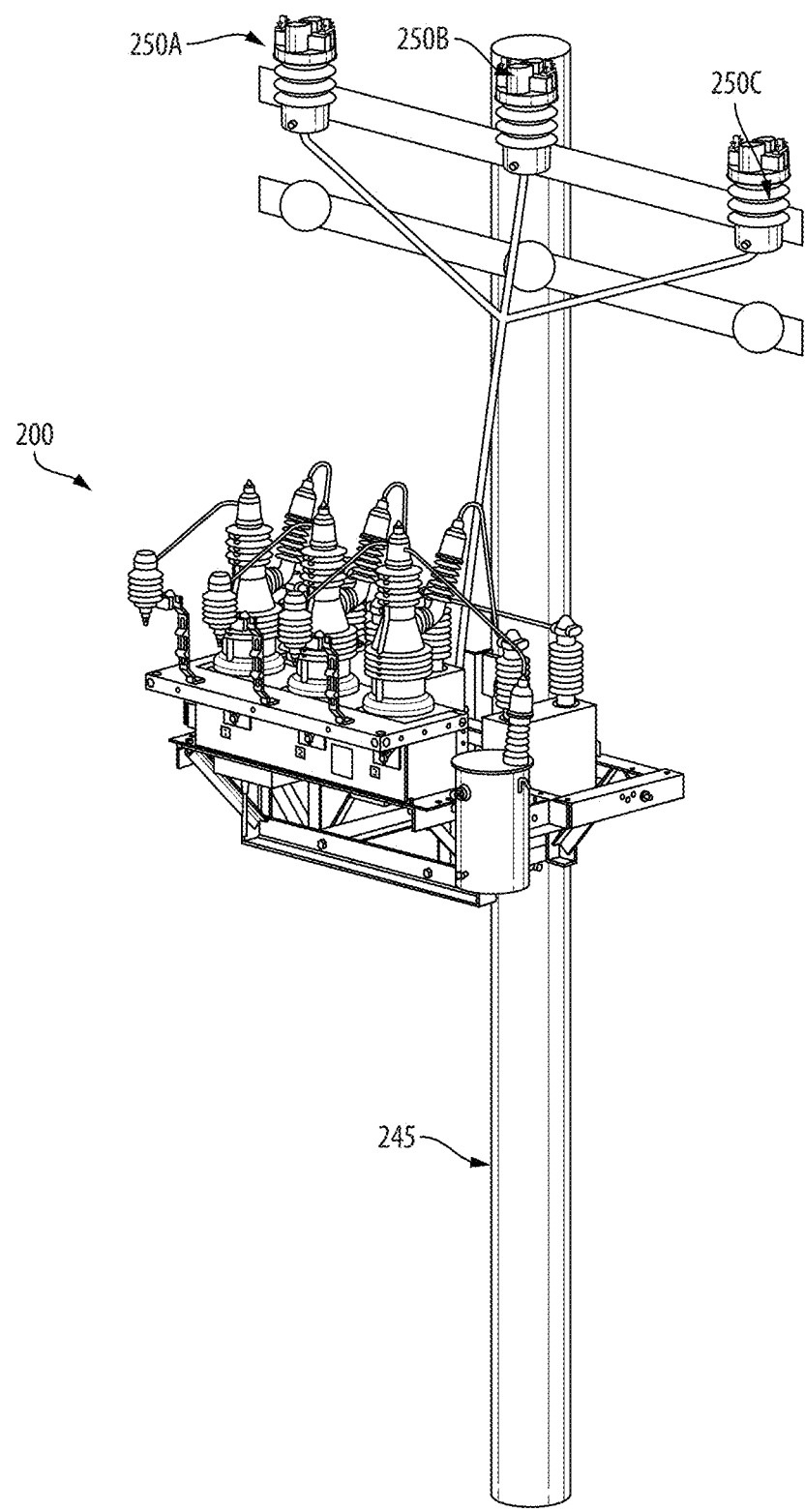
FIG. 2B illustrates a switched capacitor bank assembly according to some embodiments.

FIG. 2B illustrates an embodiment in which the integrated assembly 200 is additionally connected to, via one or more sensor cables, one or more current sensors 250A-250C positioned atop the distribution pole 245. However, it should be understood that the integrated assembly 200 is capable of operating without being connected to the one or more current sensors 250A-250C. In addition, although described as being mounted on a distribution pole 245, it should be understood that the integrated assembly 200 may also be pad mounted. For example, the integrated assembly 200 may be installed as a pad mounted assembly at a substation.

As shown in FIGS. 3A-3B, the frame 205 of the integrated assembly 200 includes a combination of brackets, beams, and other structural components arranged to physically support the integrated assembly 200 and one or more additional arresters. For example, the frame includes arrester mounts 206 to which one or more arresters can be coupled. The frame 205 is further arranged to be physically coupled to the distribution pole 245 by one or more mechanical fasteners such as bolts, screws, and/or rivets. The frame 205 is constructed from various metals, plastics, wood, and/or any suitable combination thereof.

In addition, the frame 205 includes one or more housings that are arranged to physically support and protect components of the integrated assembly 200. For example, the frame 205 includes an enclosure, or tank, 300 that houses the control electronics, including controller 230, of the integrated assembly 200. The tank 300 is configured to shield the control electronics from environmental damage and/or any electromagnetic interference that would otherwise be caused by the higher voltage components of integrated assembly 200. In some embodiments, the tank 300 includes a sealed compartment with a door to access the controller 230 and other electronics housed within. In some embodiments, the tank 300 additionally houses the communication module 235 and an internal power source. In some embodiments, the frame 205 supports one or more additional enclosures and/or compartments that are arranged to separately house the communication module 235 and internal power source.

Figure 4:
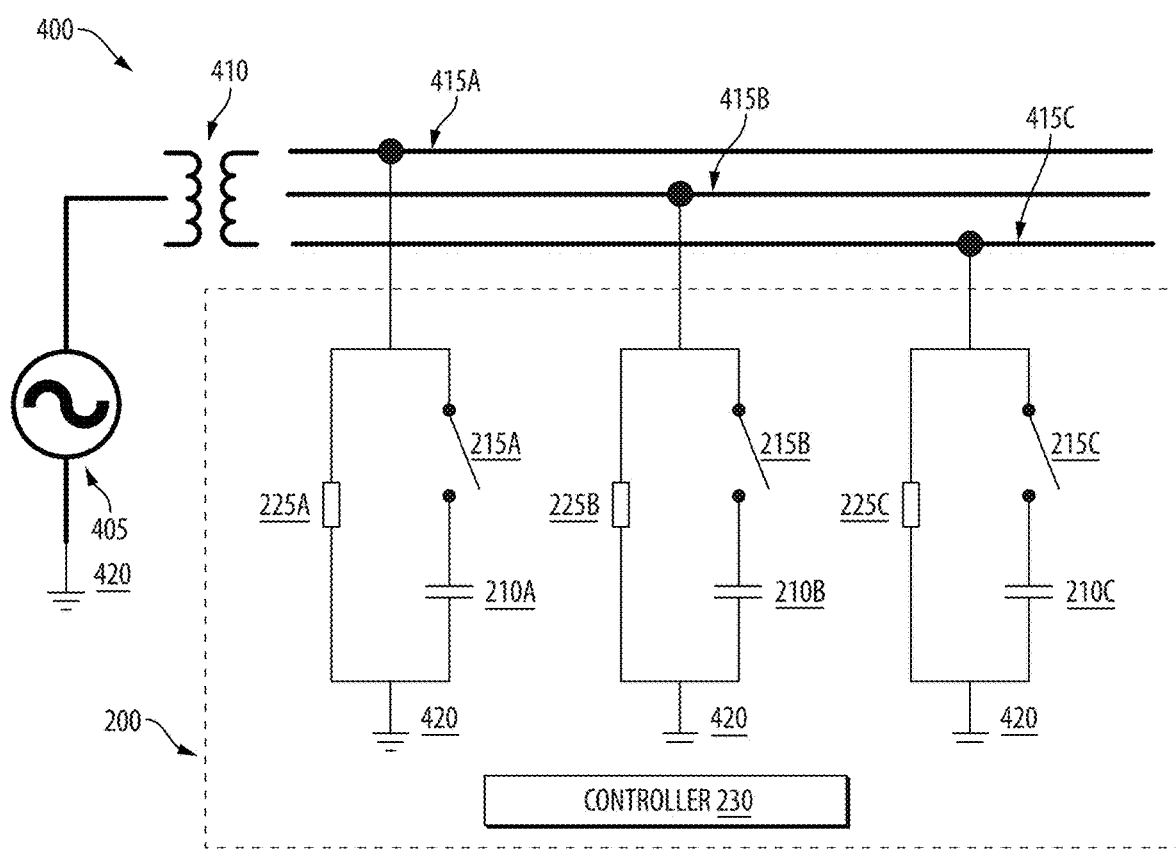
FIG. 4 illustrates a schematic diagram of a distribution network according to some embodiments.

FIG. 4 illustrates a schematic diagram of an example multi-phase power system, such as a distribution network, 400 in which the integrated assembly 200 is installed. As shown, the distribution network 400 includes a power source 405, a transformer 410, and three-phase distribution, or phase, lines 415A-415C. The transformer 410 is configured to step down the voltage supplied by power source 405 to a level (e.g., approximately 5 kV-38 kV) to be distributed by the phase lines 415A-415C. Although described as being a medium voltage distribution network, it should be understood that network 400 my implemented as a high voltage transmission network, a secondary low voltage (e.g., approximately 120 V-240 V) distribution network, and/or any other power distribution network that is desired. Similarly, although the power source 405 included in network 400 is a three-phase alternating current (AC) power source, it should be understood that other types of power sources may be used instead.

When the integrated assembly 200 is installed in the distribution network 400, each of the capacitors 210A-210C may be selectively connected to the phase lines 415A-415C by capacitor switches 215A-215C. In particular, the first capacitor 210A is selectively connected between the first phase line 415A and ground 420 by the first capacitor switch 215A. Similarly, the second capacitor 210B is selectively connected between the second phase line 415B and ground 420 by the second capacitor switch 215B. Likewise, the third capacitor 210C is selectively connected between the third phase line 415C and ground 420 by the third capacitor switch 215C.

In some embodiments, each of the capacitors 210A-210C are implemented as a capacitor bank. In such embodiments, the capacitor banks include a plurality of capacitors electrically connected in series and/or parallel with one another. In some embodiments, the capacitors 210A-210C are implemented as single capacitors.

In some embodiments, the capacitor switches 215A-215C are implemented as vacuum interrupters. In the example illustrated, the first capacitor switch 215A is implemented as a vacuum interrupter that includes a switching rod and is powered by a solenoid or magnetic actuator mechanism. In such an example, the solenoid and/or magnetic actuator mechanism is controlled by signals received from controller 230 and/or the operating handles 305A-305C supported by switch tank 300. As shown in FIGS. 3A and 3B, each respective capacitor switch 215A-215C may include a solid dielectric housing that encapsulates a respective vacuum interrupter. The solid dielectric switch housing may be formed of an insulating epoxy and/or urethane material. The capacitor switches 215A-215C further include solid dielectric bushings 220A-220C for respectively connecting to phase lines 415A-415C. The solid dielectric bushings 220A-220C are positioned atop the capacitor switch housings and may be formed of the same insulating material as the capacitor switch housings. In some embodiments, the capacitor switches 215A-215C are implemented as other types of switches, such as breakers or relays.

With reference back to FIG. 4, the integrated assembly 200 further includes voltage sensors 225A-225C that are respectively configured to sense the line voltages of phase lines 415A-415C. For example, the first voltage sensor 225A is electrically connected in parallel with the first capacitor 210A and first capacitor switch 215A and configured to sense a voltage of the first phase line 415A. Similarly, the second voltage sensor 225B is electrically connected in parallel with the second capacitor 210B and second capacitor switch 215B and configured to sense a voltage of the second phase line 415B. Likewise, the third voltage sensor 225C is electrically connected in parallel with the third capacitor 210C and third capacitor switch 215C and configured to sense a voltage of the third phase line 415C.

When compared to the prior art assembly 100 of FIG. 1, the voltage sensors 225A-225C included in the integrated assembly 200 are not mounted to the top of distribution pole 245. Rather, as shown in FIGS. 3A and 3B, each one of the voltage sensors 225A-225C may be integrated within the solid dielectric material of the bushings 220A-220C and/or the housings of the capacitor switches 215A-215C. For example, the first voltage sensor 225A may be embedded within the insulated epoxy resin of the first bushing 220A and/or the housing of the first capacitor switch 215A. Thus, there is no need for a long sensor cable, such as the 40 foot sensor cable of prior art assembly 100, to connect the first voltage sensor 225A to the controller 230. Rather, only a short cable or other small conducting medium may be needed to connect the embedded voltage sensor 225A to the controller 230, as the controller 230 is housed within the switch tank 300 proximate the embedded voltage sensor 225A. Similarly, only short cables or other small conducting mediums may be needed to connect the second and third voltage sensors 225B, 225C to the controller 230.

When compared to the voltage sensors 130 of the prior art assembly 100, which are connected to controller 135 by lengthy (e.g., approximately 40-50 ft) sensor cables, the voltage sensors 225A-225C of the integrated assembly 200 operate with increased accuracy. In particular, voltage readings provided by the voltage sensors 225A-225C to the controller 230 are not subjected to the negative effects of phase shifting or magnitude accuracy issues that are often associated with lengthy sensor cables. For example, the sensor cables 140A of the prior art assembly 100 interfere with sensor signals by inducing a phase shift on voltage readings provided to controller 135. In addition, the time taken for a voltage reading sensed by the voltage sensors 130 to reach controller is not insignificantly small. Accordingly, the controller 135 of the prior art assembly 100 does not receive highly accurate phase voltage measurements from the voltage sensors 130. In contrast, since the voltage sensors 225A-225C are embedded within the capacitor switch housings and/or the bushings 220A-220C proximate controller 230, short sensor cables that do not significantly influence the accuracy of voltage measurements can be used to provide the voltage measurements from voltage sensors 225A-225C to the controller 230. Therefore, voltage signals provided by voltage sensors 225A-225C to controller 230 experience minimal interference along their respective transmission paths.

In some embodiments, the voltage sensors 225A-225C are implemented as resistor networks configured to sense the respective voltages of phase lines 415A-415C. In other embodiments, the voltage sensors 225A-225C are implemented as another type of voltage sensor that can be integrated within the solid dielectric bushing 220A-220C and/or capacitor switch housings.

Figure 5:
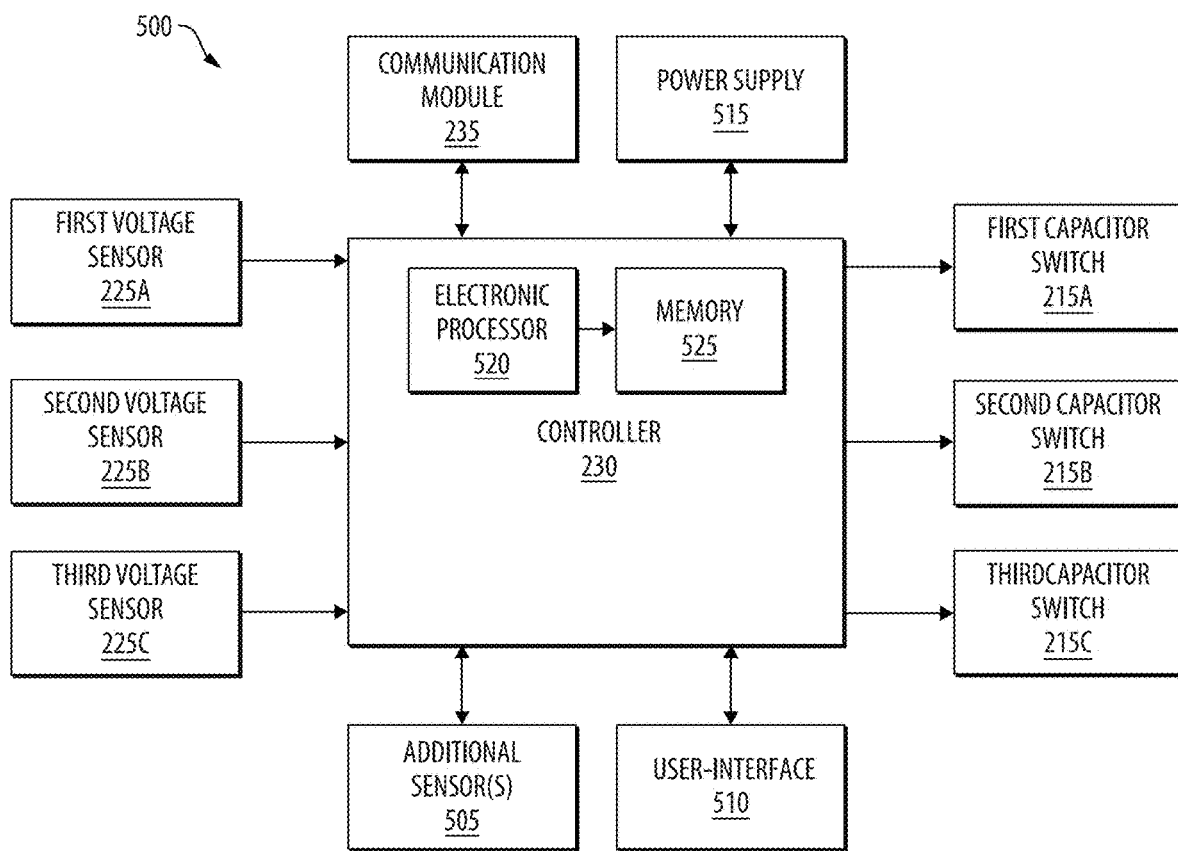
FIG. 5 illustrates a block diagram of a control system of the switched capacitor bank assembly of FIG. 2A or FIG. 2B.

FIG. 5 illustrates a block diagram of an example control system 500 of the integrated assembly 200 according to some embodiments. The control system 500 includes the controller 230. The controller 230 is electrically and/or communicatively connected to a variety of modules or components of the integrated assembly 200. For example, the controller 230 is connected to the capacitor switches 215A-215C, the voltage sensors 225A-225C, the communication module 235, one or more additional sensors 505, a user-interface 510, and/or a power supply 515.

The communication module 235 is configured to provide communication between the integrated assembly 200 and one or more external devices (for example, a smart phone, a tablet, a laptop, etc.). For example, the communication module 235 includes one or more wireless and/or wired transmitters, receivers, and/or transceivers used for communicating with external devices. In some embodiments, the communication module 235 is configured to communicate with external devices operated by a utility service provider and/or a service technician. In such an embodiment, the integrated assembly 200 communicates with the one or more external devices through a network. The network may be, for example, a wide area network (WAN) (e.g., the Internet, a TCP/IP based network, a cellular network, such as, for example, a Global System for Mobile Communications [GSM] network, a General Packet Radio Services [GPRS] network, a Code Division Multiple Access [CDMA] network, an Evolution-Data Optimized [EV-DO] network, an Enhanced Data Rates for GSM Evolution [EDGE] network, a 3 GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network may be, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). In some embodiments, the communication module 235 communicates with one or more peripheral devices in a supervisory control and data acquisition (SCADA) management system.

In some embodiments, the controller 230 is configured to communicate with one or more additional sensors 505. For example, in some embodiments, the one or more additional sensors include current sensors 250A-250C which are used to measure the current flowing through phase lines 415A-415C. In some embodiments, the one or more additional sensors 505 include voltage sensors used to measure the respective voltages across the capacitors 210A-210C. In some embodiments, the one or more additional sensors 505 include one or more temperature sensors, moisture sensors, vibration sensors, and/or other types of sensors used to measure other physical and/or electrical characteristics of the integrated assembly 200.

The controller 230 is further configured to communicate with a user-interface 510 of the integrated assembly 200. The user-interface 510 is configured to receive input from a service technician and/or output information to a service technician concerning the integrated assembly 200. In some embodiments, the user-interface 510 includes the switch operating handles 305A-305C used by a service technician to manually operate the capacitor switches 215A-215C. In some embodiments, the user-interface 510 includes a display (for example, a primary display, a secondary display, etc.) and/or other output devices (light-emitting diodes ("LEDs"), speakers, etc.) for outputting a status of the integrated assembly 200 to a technician.

Figure 6A:
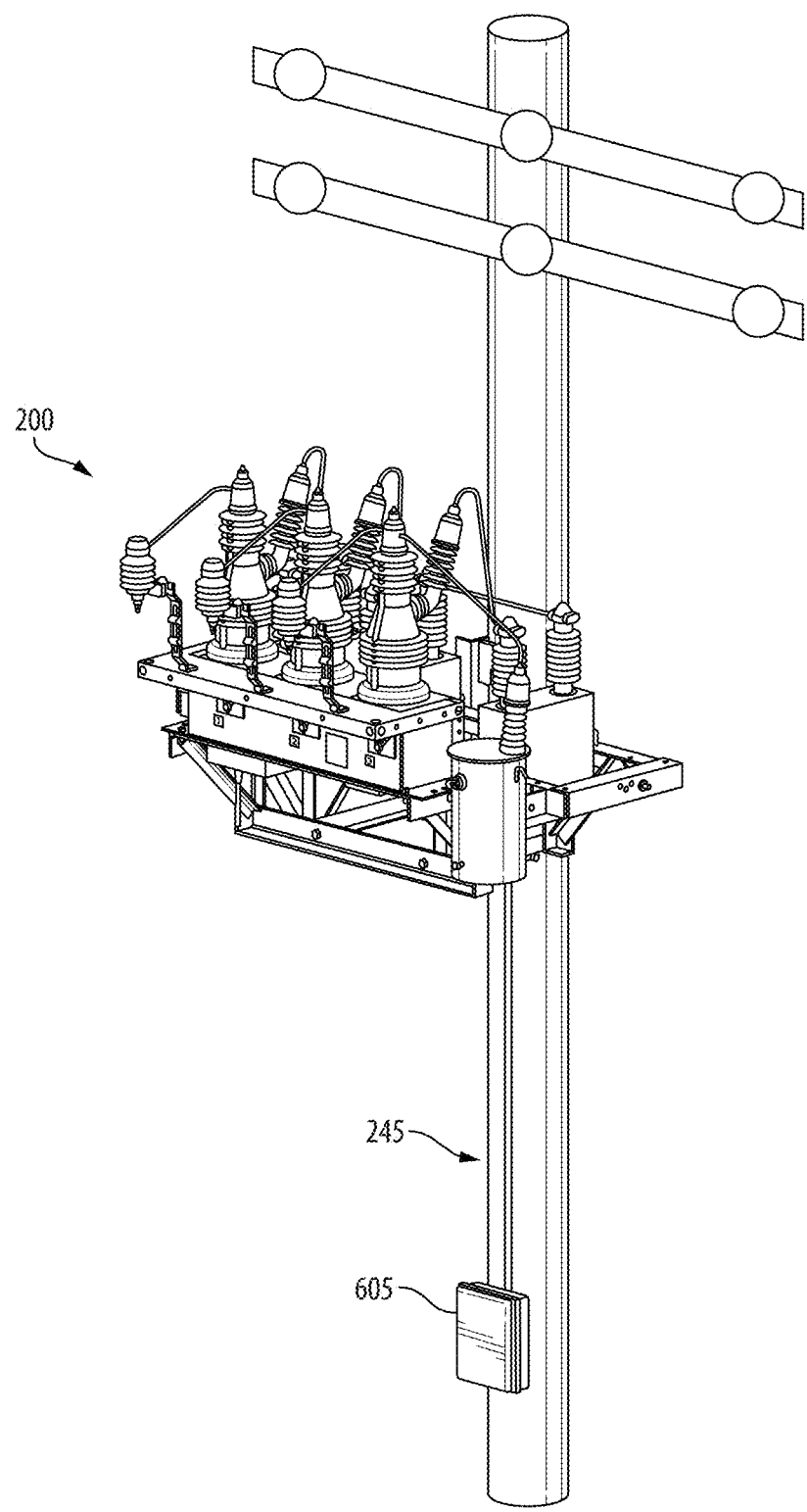
FIG. 6A illustrates a switched capacitor bank assembly according to some embodiments.
Figure 6B:
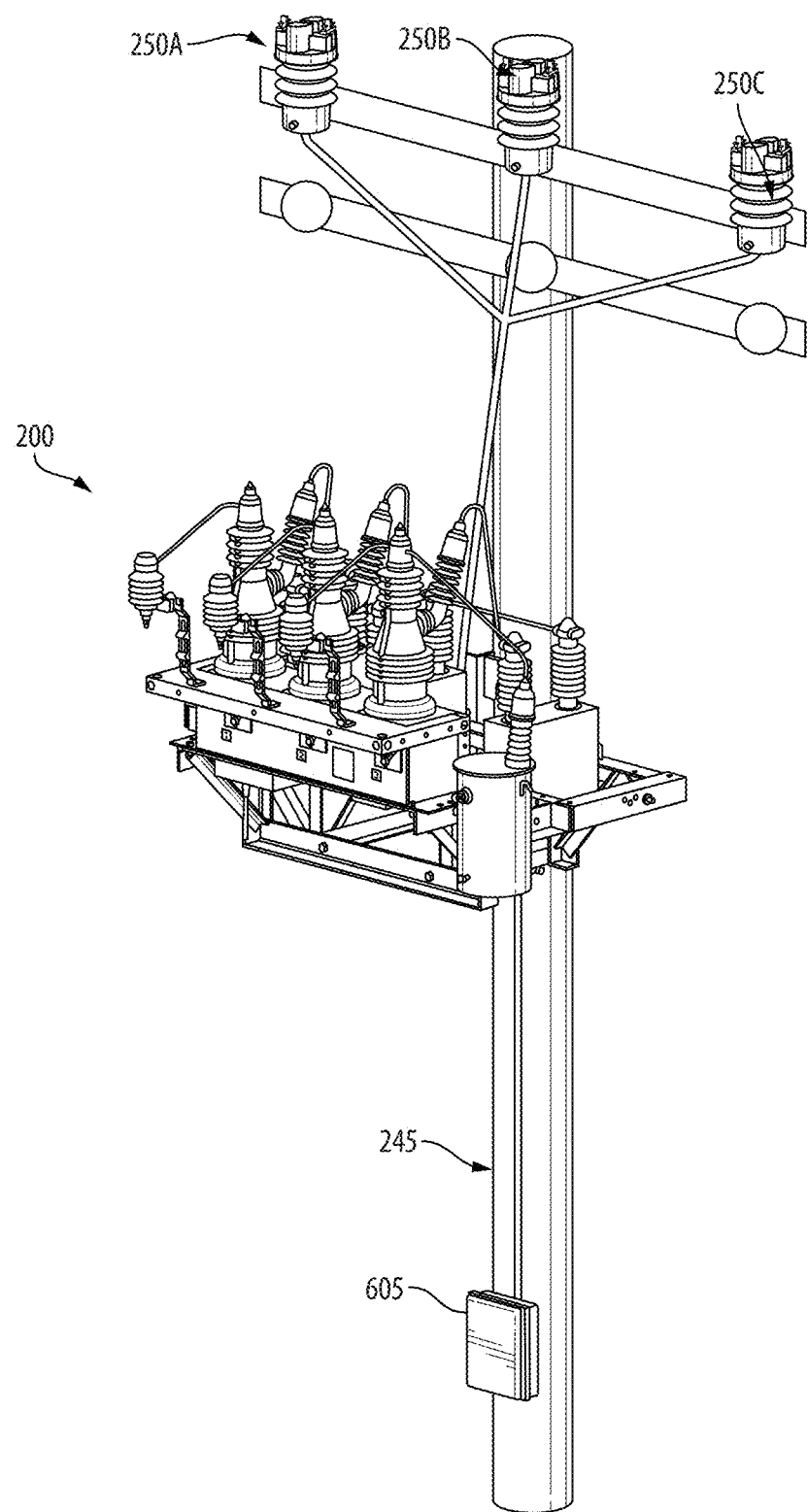
FIG. 6B illustrates a switched capacitor bank assembly according to some embodiments.
Figure 7A:
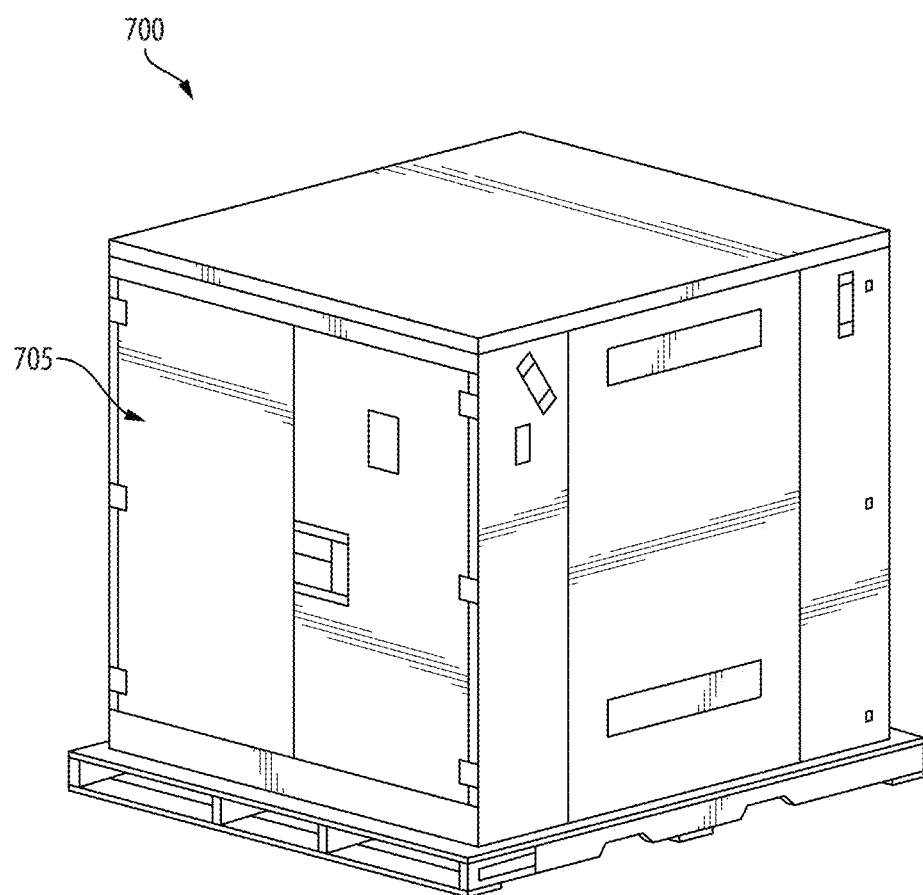
FIGS. 7A-7K illustrate a switched capacitor bank assembly according to some embodiments.
Figure 7B:
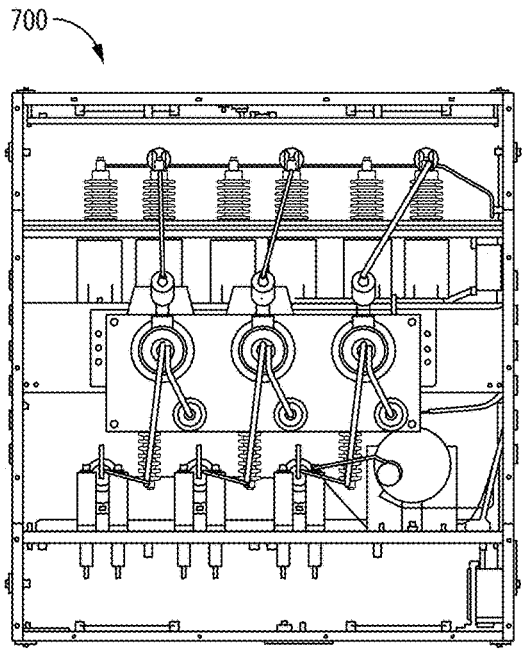
Figure 7C:
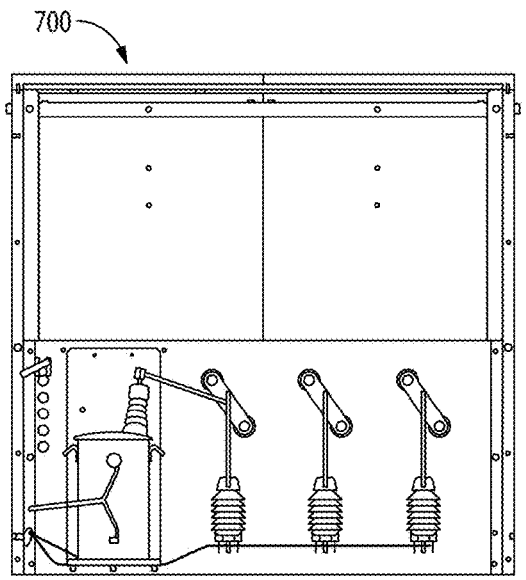
Figure 7D:
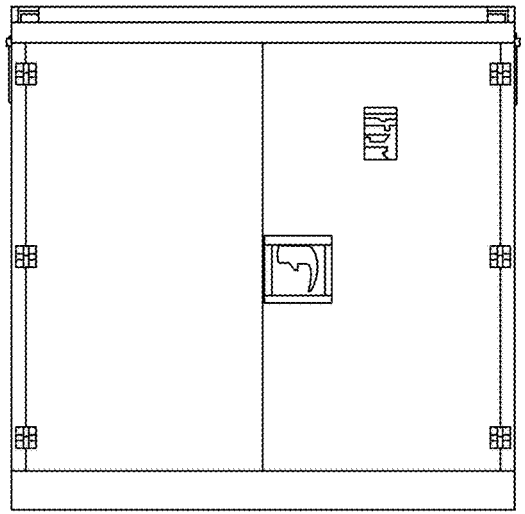
Figure 7E:
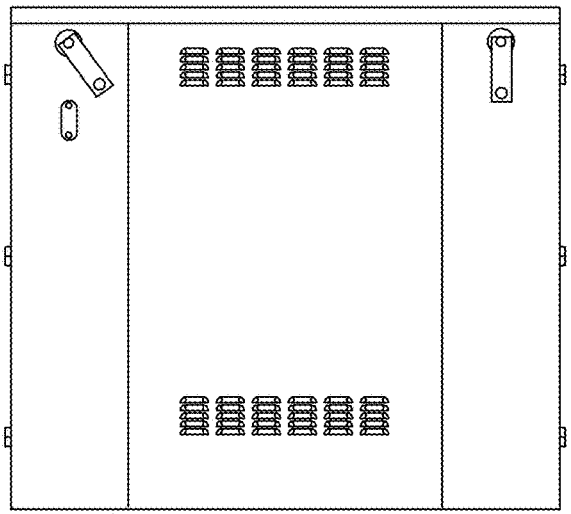
Figure 7F:
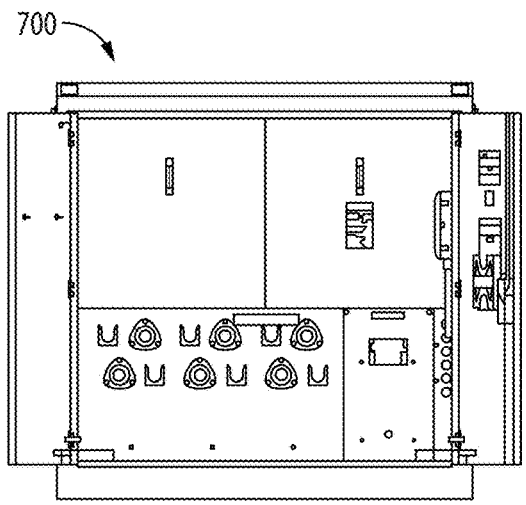
Figure 7G:
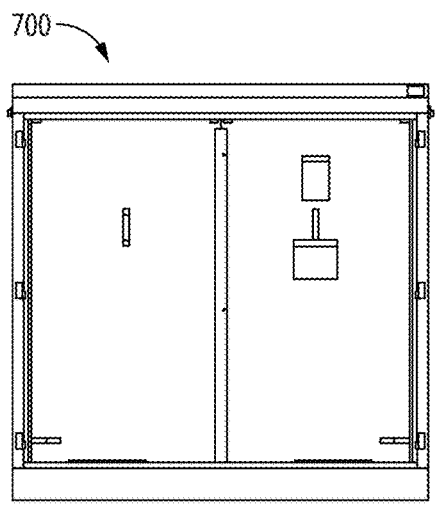
Figure 7H:
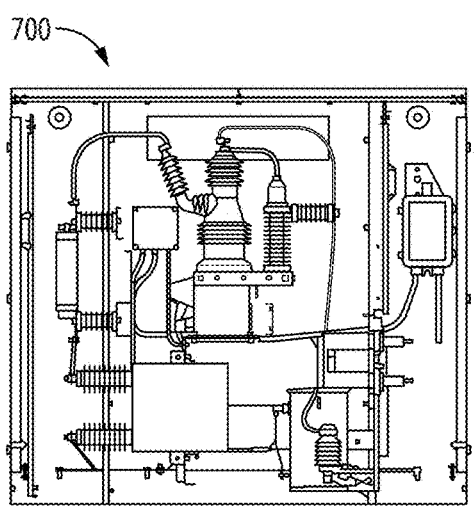
Figure 7I:
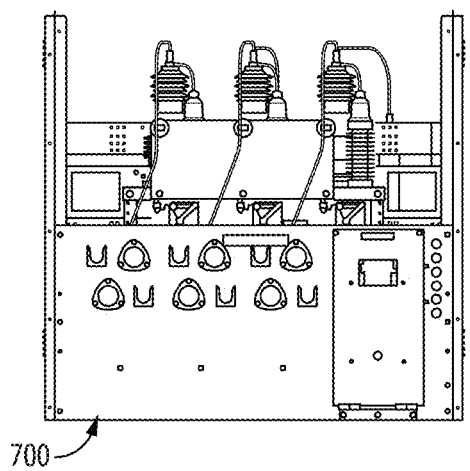
Figure 7J:
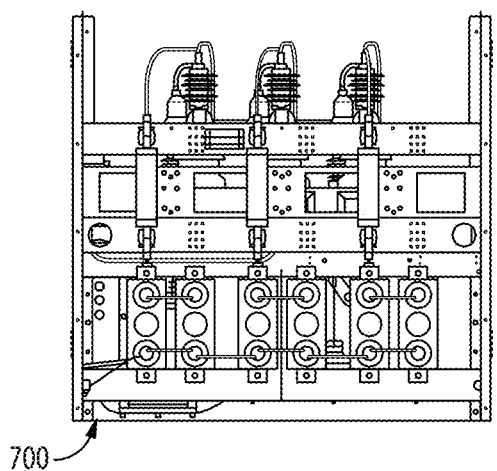
Figure 7K:
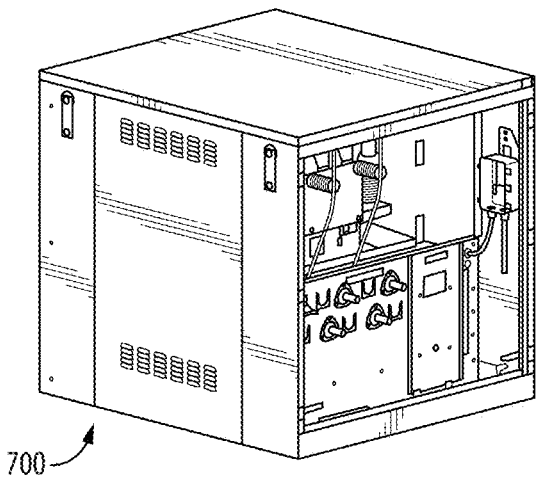

In some embodiments, all of the components of the user-interface 510 are supported by the frame 205. In some embodiments, one or more of the components of the user-interface 510 are located in a cabinet that can be easily accessed by a service technician (e.g., positioned near the bottom of the distribution pole 245). For example, FIGS. 6A and 6B illustrate example embodiments in which a cabinet 605 including one or more components of the user-interface 510 is mounted to the bottom of the distribution pole 245. In the illustrated example of FIGS. 6A and 6B, the controller 230 is connected, via one or more cables, to the components of user-interface 510 included in the cabinet 605. For example, the one or more cables may be implemented as power over ethernet (POE) cables. In some embodiments, the one or more components of the user-interface 510 included in the cabinet 605 are components that provide a user with control of one or more components of the integrated assembly 200. For example, the cabinet 605 includes one or more input mechanisms (for example, buttons, switches, a touch-screen display, a keyboard, a mouse, and/or the like) for controlling components included in the integrated assembly 200. The one or more input mechanisms included in the cabinet 605 are used by a service technician to, for example, manually open and/or close the capacitor switches 215A-215C. In some embodiments, the cabinet 605 also includes one or more output mechanisms (for example, a display, a speaker, a touch-screen display, and/or the like) for providing information associated with the integrated assembly 200 to a service technician.

In some embodiments, the communication module 235 is located in the cabinet 605. In such embodiments, the communication module 235 may be connected to the controller 230 and/or other components of the integrated assembly 200 via the one or more cables. Furthermore, in such embodiments, the communication module 235 includes one or more radio communication modules positioned in the cabinet 605 that can be easily accessed, maintained, and/or swapped out by service technicians. Accordingly, in such embodiments, service technicians can simply access the cabinet 605 to perform maintenance on the communication module 235 instead of having to perform maintenance on the communication module 235 at an elevated position near the high voltages present at the integrated assembly 200.

Referring back to FIG. 5, the control system 500 of integrated assembly 200 may further include a power supply 515 that is electrically and/or communicatively coupled to the controller 230. The power supply 515 is configured to selectively provide power to the various components of the integrated assembly 200. In some embodiments, the power supply 515 is configured to power components of the integrated assembly 200 with power received from phase lines 415A-415C. In such embodiments, the power supply 515 includes one or more AC-AC converters, AC-DC converters, and/or DC-DC converters configured to convert the AC power supplied by phase conductor phase lines 415A-415C to a desired voltage before it is provided to the various components of the integrated assembly 200. In some embodiments, the power supply 515 includes an internal power source, such as a rechargeable battery or a solar panel, for powering the components of integrated assembly 200.

In some embodiments, the controller 230 includes a plurality of electrical and electronic components that provide power, operational control, and/or protection to the components and modules within the controller 230 and/or the integrated assembly 200. For example, the controller 230 includes, among other things, an electronic processor 520 (for example, a microprocessor or another suitable programmable device) and a memory 525.

The memory 525 includes, for example, a program storage area and a data storage area. The program storage area and the data storage area can include combinations of different types of memory, such as read-only memory (ROM) and random-access memory (RAM). Various non-transitory computer readable media, for example, magnetic, optical, physical, or electronic memory may be used. The electronic processor 520 is communicatively coupled to the memory 525 and executes software instructions that are stored in the memory 525, or stored in another non-transitory computer readable medium such as another memory or a disc. The software may include one or more applications, program data, filters, rules, one or more program modules, and other executable instructions. In some embodiments, the memory 525 includes one or more modules configured to perform various functions of controller 230. For example, memory 525 may include a voltage comparison program used for analyzing voltages received from voltage sensors 225A-225C. Memory 525 may additionally or alternatively include a switch control module configured to generate signals (e.g., close and/or open signals) to instruct the capacitor switches 215A-215C to open or close.

During operation of the integrated assembly 200, the controller 230 receives phase line voltage signals from the voltage sensors 225A-225C. The controller 230 is configured to determine the magnitude and phase of the phase line voltages based on the received voltage signals. For example, the controller 230 is configured to determine the magnitude and phase of the voltage of phase line 415A directly based on voltage signals provided by the first voltage sensor 225A. Similarly, the controller 230 is configured to determine the magnitude and phase of the voltage of phase line 415B directly based on voltage signals provided by the second voltage sensor 225B. Likewise, the controller 230 is configured to determine the magnitude and phase of the voltage of phase line 415C directly based on voltage signals provided by the third voltage sensor 225C.

The controller 230 is further configured to determine whether to open or close the capacitor switches 215A-215C based on the determined voltages of phase lines 415A-415C. During operation, the capacitor switches 215A-215C are normally open. However, the controller 230 is configured to close one or more of the switches 215A-215C in response to determining that the phase line voltages are unbalanced and/or not in phase with one another.

When the controller 230 determines to close one or more of the capacitor switches 215A-215C, a respective capacitor switch 215 should be closed at a time when the corresponding phase line voltage is at a waveform zero (e.g., at a zero-crossing). For example, if the controller 230 determines to close capacitor switch 215A, the controller 230 should close the capacitor switch 215A when the AC voltage of phase line 415A is at a waveform zero. If a capacitor switch 215 closes at a time when the corresponding phase line AC voltage across the switch is not at a waveform zero, disturbances may occur due to heavy inrush currents as the capacitors are charged. The disturbances include, for example, voltage dips, transient voltages, harmonics, resonance peaks and/or other undesirable effects on the electrical system. Such disturbances may result in damage to and/or other problems associated with sensitive customer equipment.

With respect to the prior art assembly 100 of FIG. 1, the controller 135 is incapable of accurately performing synchronous zero-voltage closing of the capacitor switches 115. As described above, phase voltage measurements taken by voltage sensors 130 experience phase shifting and/or are otherwise modified by the inductance of long sensor cable 140A, and thus, the controller 135 cannot accurately determine a waveform zero when closing a capacitor switch 115. To account for this deficiency in synchronous zero-voltage closing, switched capacitor bank assemblies of the prior art have employed add-on control devices that are configured to execute complex algorithms for estimating a respective phase of each line voltage based on a single phase voltage measurement. In such prior art assemblies, a complex calibration process is required during installation of the assembly at the distribution pole, as many of the third-party components (e.g., voltage sensors, controllers, add-on synchronous zero-voltage controllers, etc.) are separately manufactured. Therefore, a prior art assembly may not be reliably used immediately after installation, as additional calibration and commission of the third-party components is required before the assembly is capable of accurately controlling the capacitor switches. In some cases, other assemblies of the prior art blindly time their operations based on a single-phase voltage sensor and calibration information regarding the electrical system to which the system is connected. In such cases, these prior art assemblies frequently close capacitor switches when line voltages are at or near a waveform peak, and thus, induce significant transient voltages on the distribution network in which they are installed.

In contrast, the integrated assembly 200 of the present disclosure is operable to perform accurate synchronous zero-voltage closing of the capacitor switches 215A-215C directly based on phase line voltage measurements without the need for an add-on control device or onsite calibration. That is, since the phase line voltage measurements received from voltage sensors 225A-225C experience little to no phase shift caused by the sensor cables connecting the controller 230 to the voltage sensors 225A-225C, the controller 230 is operable to accurately determine a waveform zero directly from the received voltage measurements. Thus, the integrated assembly 200 may have no need for an add-on control device that is configured to estimate respective voltage phases when closing capacitor switches. Rather, the controller 230 can independently determine a waveform zero of each phase line voltage when closing a respective capacitor switch 215A-215C. As described above, since the integrated assembly 200 is capable of accurately performing synchronous zero-voltage closing of the capacitor switches 215A-215C, closure of the capacitor switches 215A-215C may not induce disturbances such as, for example, voltage dips, transient voltages, harmonics, resonance peaks and/or other undesirable effects, on the distribution system. Furthermore, the individual components of the integrated assembly 200 can be calibrated at a manufacturing site and/or other location prior to installation at the distribution pole since every component is included within the single package. Therefore, upon installation of the integrated assembly 200 on a distribution pole, the integrated assembly 200 is immediately ready for operation without the need for onsite calibration.

For example, the controller 230 is configured to determine whether the voltage of phase line 415A is at a waveform zero directly from the voltage measurement received from voltage sensor 225A. Similarly, the controller 230 is configured to determine whether the voltage of phase line 415B is at a waveform zero directly from the voltage measurement received from voltage sensor 225B and configured to determine whether the voltage of phase line 415C is at a waveform zero directly from the voltage measurement received from voltage sensor 225C. Accordingly, the controller 230 is selectively closes one or more of the capacitor switches 215A-215C when the corresponding phase line voltages are at a waveform zero (e.g., zero-crossing).

FIGS. 7A-7K illustrate an integrated switched capacitor bank assembly, or integrated assembly, 700 according to some embodiments. The integrated assembly 700 has a similar configuration to the integrated assembly 200 of FIGS. 2A and 2B and/or FIGS. 6A and 6B; however, the integrated assembly 700 is configured to be pad, or floor, mounted rather than mounted on a distribution pole. For example, the integrated assembly 700 also includes capacitors 210A-210C, capacitor switches 215A-215C, dielectric bushings 220A-220B, integrated voltage sensors 225A-225B, a controller 230, a communication module 235, a power transformer 240, and/or optional current sensors that are supported by a single frame. However, as shown, the integrated assembly 700 further includes a cabinet, or housing 705, that contains the components of the integrated assembly 700 while the integrated assembly 700 is mounted on a pad. Accordingly, the integrated assembly 700 offers the benefits of integrated assembly 200 while being mounted on a pad or other ground-level surface instead of a distribution pole.

Thus, the disclosure provides, among other things, an integrated switched capacitor bank. Various features and advantages of the various embodiments disclosed herein are set forth in the following claims. In the foregoing specification, specific examples, features, and aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter

What is claimed is:

1. A switched capacitor bank assembly comprising:
   a first capacitor;
   a first switch selectively connected between the first capacitor and a first phase line;
   a first voltage sensor integrated within a housing of the first switch and used to sense a voltage of the first phase line;
   a controller including an electronic processor, the controller operably coupled to the first voltage sensor and the first switch; and
   a frame arranged to physically support the first capacitor, the first switch, the first voltage sensor, and the controller;
   wherein the controller is contained within a second housing supported by the frame; and
   wherein the second housing shields the controller from electromagnetic interference.

2. The switched capacitor bank assembly of claim 1, wherein the first switch is a vacuum interrupter and includes a housing that is formed of a solid dielectric material.

3. The switched capacitor bank assembly of claim 2, wherein the first voltage sensor is embedded in the solid dielectric material of the housing.

4. The switched capacitor bank assembly of claim 1, wherein the first switch further includes a solid dielectric bushing that connects the first switch to the first phase line; and
   wherein the first voltage sensor is embedded within the solid dielectric bushing.

5. The switched capacitor bank assembly of claim 1, wherein the controller is further configured to:
   determine when a voltage of the first phase line is at a zero-crossing based on a voltage signal received directly from the first voltage sensor; and
   close the first switch when a voltage of the first phase line is at a zero-crossing.

6. The switched capacitor bank assembly of claim 1, wherein the second housing is a tank that physically supports the first switch; and
   wherein the tank includes a handle used for manually operating the first switch.

7. The switched capacitor bank assembly of claim 1, further comprising a communication module configured to wirelessly communicate with an external device.

8. The switched capacitor bank assembly of claim 7, wherein the communication module is contained within a third housing that is physically supported by the frame.

9. The switched capacitor bank assembly of claim 8, wherein the third housing is separate from a second housing that encapsulates the controller.

10. The switched capacitor bank assembly of claim 1, wherein the frame further includes an arrester mounting portion.

11. The switched capacitor bank assembly of claim 1, further comprising:
    a second capacitor physically supported by the frame;
    a second switch selectively connected between the second capacitor and a second phase line, the second switch being physically supported by the frame; and
    a second voltage sensor integrated within a housing of the second switch and configured to sense a voltage of the second phase line;
    wherein the controller is further configured to determine when the voltage of the second phase line is at a zero-crossing based on a second voltage signal received directly from the second voltage sensor.

12. The switched capacitor bank assembly of claim 11, further comprising:

a third capacitor physically supported by the frame;

a third switch selectively connected between the third capacitor and a third phase line, the third switch being physically supported by the frame;

a third voltage sensor integrated within a housing of the third switch and configured to sense a voltage of the third phase line; and wherein the controller is further configured to determine when the voltage of the third phase line is at a zero-crossing based on a third voltage signal received directly from the third voltage sensor.

13. The switched capacitor bank assembly of claim 1, wherein the frame is mounted to a distribution pole.

14. The switched capacitor bank assembly of claim 1, wherein the frame is mounted to a pad.

15. The switched capacitor bank assembly of claim 14, further comprising a cabinet arranged to contain the first capacitor, the first switch, the first voltage sensor, the controller, and the frame.

16. A multi-phase power system, comprising:

a plurality of phase lines including a first phase line, a second phase line, and a third phase line; and a switched capacitor bank assembly including:

a plurality of capacitors including a first capacitor, a second capacitor, and a third capacitor, a plurality of voltage sensors including a first voltage sensor for measuring a voltage of the first phase line, a second voltage sensor for measuring a voltage of the second phase line, and a third voltage sensor for measuring a voltage of the third phase line, a plurality of switches including a first switch connected between the first phase line and the first capacitor, a second switch connected between the second phase line and the second capacitor, and a third switch connected between the third phase line and the third capacitor, a controller including an electronic processor and coupled to the plurality of voltage sensors and the plurality of switches, the controller configured to selectively connect, using the plurality of switches, the plurality of capacitors to the respective ones of the plurality of phase lines based on signals received from the plurality of voltage sensors, and a frame arranged to physically support the plurality of capacitors, the plurality of voltage sensors, the plurality of switches, the controller, and an arrester mounting portion.

17. The multi-phase power system of claim 16, further comprising a distribution pole;

wherein the frame is mounted to the distribution pole.

18. The multi-phase power system of claim 16, wherein the first voltage sensor is integrated in a housing of the first switch, the second voltage sensor is integrated in a housing of the second switch, and the third voltage sensor is integrated in a housing of the third switch.

19. The multi-phase power system of claim 16, wherein the controller is contained within a controller housing that shields the controller from electromagnetic interference.

\* \* \* \* \*